United States Patent
Bratina et al.

(10) Patent No.: US 6,831,939 B2
(45) Date of Patent: Dec. 14, 2004

(54) DUAL USE OF AN INDUCTION FURNACE TO PRODUCE HOT METAL OR PIG IRON WHILE PROCESSING IRON AND VOLATILE METAL CONTAINING MATERIALS

(75) Inventors: James E. Bratina, Greenwood, IN (US); Fred M. Fehsenfeld, Sr., Indianapolis, IN (US)

(73) Assignee: Heritage Environmental Services, LLC, Indianapolis, IN (US)

( * ) Notice: Subject to any disclaimer, the term of this patent is extended or adjusted under 35 U.S.C. 154(b) by 0 days.

(21) Appl. No.: 10/407,885

(22) Filed: Apr. 4, 2003

(65) Prior Publication Data

US 2004/0091014 A1 May 13, 2004

Related U.S. Application Data

(60) Provisional application No. 60/425,539, filed on Nov. 12, 2002.

(51) Int. Cl.[7] .......................... H05B 11/00; F27D 17/00
(52) U.S. Cl. .................. 373/7; 373/4; 373/8; 373/140; 373/142
(58) Field of Search ............................... 373/1, 2, 4, 7, 373/8, 138–142; 75/10.15, 10.31, 500, 665, 695, 746

(56) References Cited

U.S. PATENT DOCUMENTS

| | | |
|---|---|---|
| 4,403,327 A | 9/1983 | Granstrom et al. |
| 4,612,041 A | 9/1986 | Matsuoka et al. |
| 4,762,554 A | 8/1988 | Lazcano-Navarro |
| 4,802,919 A | 2/1989 | Fey |
| 4,878,944 A | 11/1989 | Rolle et al. |
| 5,139,567 A * | 8/1992 | Matsuoka et al. ......... 75/10.15 |
| 5,188,658 A | 2/1993 | Aune et al. |
| 5,249,198 A | 9/1993 | Matsuoka |
| 5,304,230 A | 4/1994 | Steins et al. |
| 5,479,436 A | 12/1995 | Hashida et al. |
| 5,493,580 A | 2/1996 | Fudala |
| 5,757,843 A | 5/1998 | Otsuka et al. |
| 5,980,606 A | 11/1999 | Sarma et al. |
| 6,102,982 A | 8/2000 | Isozaki et al. |
| 6,136,059 A | 10/2000 | Zoppi |

\* cited by examiner

Primary Examiner—Tu Hoang
(74) Attorney, Agent, or Firm—Baker & Daniels

(57) ABSTRACT

A method of operating an induction furnace so as to receive electric arc furnace (EAF) dust, basic oxygen furnace (BOF) sludge/dust and/or other iron and volatile metals containing materials as a feed stream on a batch, continuous or semi-continuous basis together with a iron-containing material feed, and therefrom produce an iron-containing hot metal or pig iron product while recovering iron value from the feed materials and recovering volatile metal components contained in the feed materials.

19 Claims, 3 Drawing Sheets

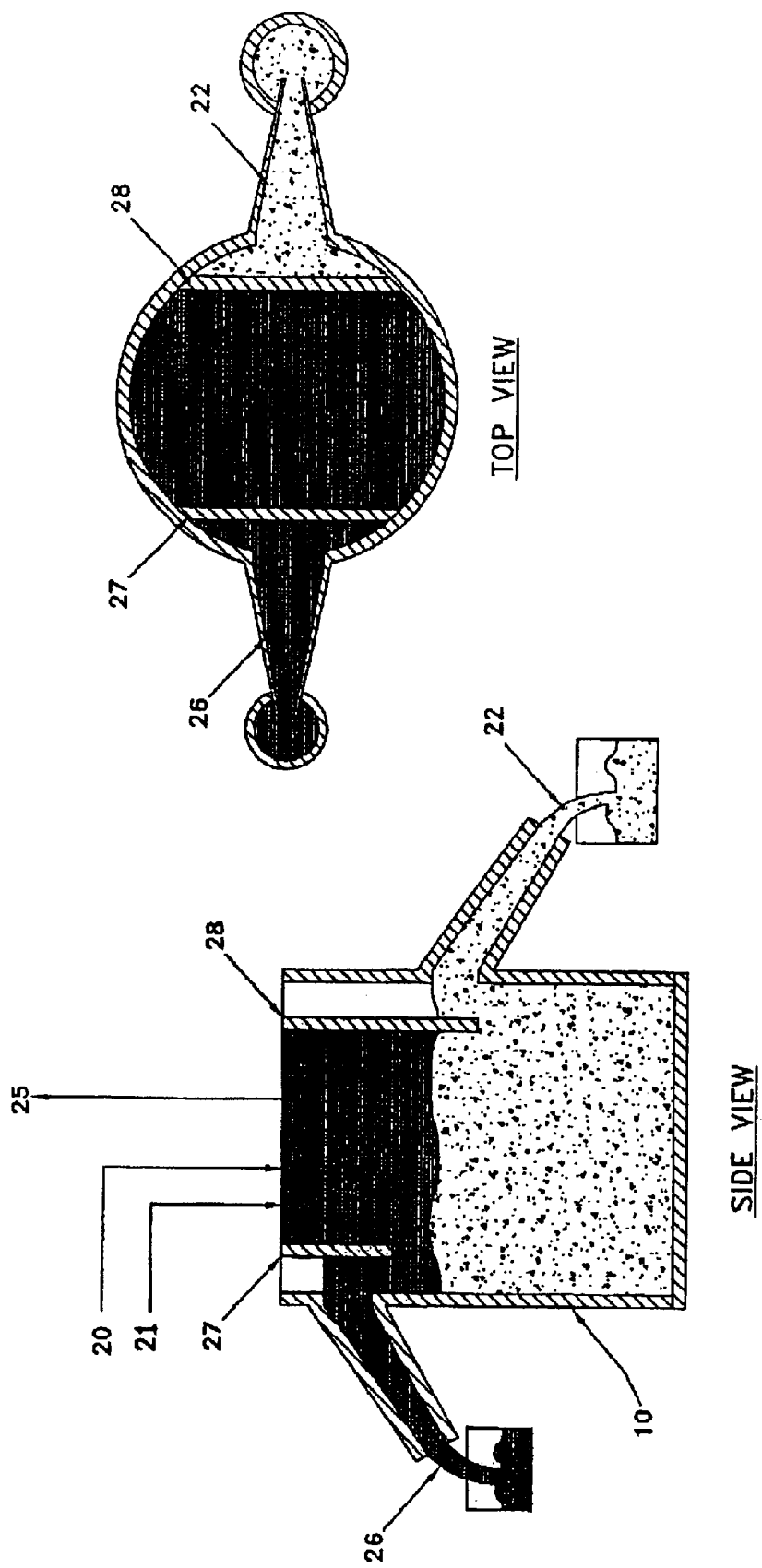

DUAL USE OF AN INDUCTION FURNACE TO PRODUCE HOT METAL OR PIG IRON WHILE PROCESSING IRON AND VOLATILE METAL CONTAINING MATERIALS

This application claims the benefit of Provisional application Ser. No. 60/425,539, filed Nov. 12, 2002.

TECHNICAL FIELD

The present invention relates to induction furnaces and more particularly to the use of an induction furnace to produce hot metal or pig iron while, at the same time, recover iron and volatile metals (such as zinc, lead and cadmium) value from iron and volatile metal containing materials such as electric arc furnace dust (EAF), basic oxygen furnace sludge, mill scale, galvanizing sludge/dust, batteries and other materials. This invention is focused on the expansion of U.S. Pat. No. 6,136,059 (Zoppi) that provides for the processing of EAF dust in an induction furnace to produce zinc and pig iron products. This expansion covers the use of a broader range of feed materials containing iron and volatile metals, plus the production of hot metal in addition to pig iron for use in the steel industry. It also addresses the continuous operation of an induction furnace for this purpose.

BACKGROUND ART

There are many waste materials that are generated during the production of steel and in other manufacturing processes. During the production of steel, electric arc furnace dust and basic oxygen furnace (BOF) dust/sludge are captured and collected for either disposal or recycle. Volatiles and particulate resulting from the BOF process are frequently subjected to a water scrubber, consequently unless the solids are dried, solids accumulated by a water scrubber form a sludge.

The major components in these dusts are iron (up to 60 wt. %) and zinc (up to 30 wt. %), usually in the oxide form. In addition, these dusts contain smaller quantities of calcium, magnesium, manganese, chloride, lead, cadmium and other trace elements. The steel industry generates about 30 to 40 pounds of these types of dust for each ton of steel produced in steel making facilities. The estimated generation of these dusts in the United States in 1997 was in excess of one million tons with nearly half of it being disposed in landfills.

EAF dust is a listed hazardous waste (K061) under United States environmental regulations. Under this regulatory program, EAF dust is subject to specific record keeping, handling requirements and processing costs when it is recycled or disposed of. BOF sludge/dust is not a listed hazardous waste, but the lack of adequate reuse options results in a large quantity of this material being disposed of in landfills.

However, both of these materials contains significant quantities of iron that make it valuable for use directly in steel making processes as a substitute for other iron containing materials such as scrap steel, hot metal, sinter dust, and other iron oxides present at steel making facilities. In addition, EAF dust also contains significant quantities of zinc, which makes it valuable as a feed for zinc manufacturing processes. BOF sludge contains smaller quantities of zinc, but the zinc present can be recovered for reuse as a zinc product.

Present methods for handling EAF dust include processing it in Waelz kilns, rotary hearth furnaces, and flame reactor processes to recover zinc. EAF dust is also subject to stabilization processes followed by landfill disposal. A small quantity of BOF sludge is returned to the BOF steel making process in some locations and some is recycled in other manners, but a large volume is disposed as a waste material in landfills.

Generally, it can be economical to subject EAF dust having a high zinc content to existing zinc recovery procedures, and send EAF dust having a low zinc content to landfills for disposal as a waste. Since hot metal is the only energy source in BOF facilities, only a limited quantity (approximately 20% of the total steel production rate) of scrap and other solid feed materials that require energy for their use in the BOF process can be added to the charge mix. This limits the quantity of BOF sludge that can be returned to the BOF steel making process. As a result some portion of the BOF sludge is usually sent to landfills for disposal.

Other process methods for recovering zinc and/or iron from EAF dust and BOF sludge have been attempted with limited success. Such processes include thermal processes, hydrometallurgical processes or combinations thereof. In most cases, these processes were not successful because they are expensive to build, expensive to operate and/or they cannot be used to process all of the EAF dust and BOF sludge/dust material, so that waste material remains that still must be disposed of in landfills.

In addition, any processes that treat EAF dust are subject to significant environmental regulatory requirements under the Resource Conservation and Recovery Act ("RCRA"). This is due to the fact that current processes have been specifically developed for the sole purpose of processing EAF dust as a hazardous waste. To date, those in the steel industry view EAF dust as a listed hazardous waste, and accordingly logically conclude that using EAF dust as any type of feed or reactant will necessarily result in the formation, generation or preservation of a hazardous material.

Southwick, "Recovery of Iron and Zinc From Steel Mill Wastes," a presentation from a Conference Organized by Gorham/Inertech in Pittsburgh. Pa. on May 17–19, 1999 provides a summary of various processes proposed to recover iron and zinc from mill wastes. In addition, U.S. Pat. Nos. 4,605,435, 5,013,532, 5,082,493, 5,435,835, 5,439,505, 5,493,580, 5,538,532, 5,667,553, 5,879,617, 5,993,512, 6,102,982, 6,120,577, and 6,221,124 are directed to various methods and apparatus for processing EAF dust.

U.S. Pat. No. 6,136,059 to Zoppi, incorporated herein by reference, discloses the use of an induction furnace for the sole purpose of processing EAF dust. That is, the only feed into the induction furnace after providing a "heel" for the required oxidation and reduction reactions is a half charge of cast iron which is not replenished, but rather to which pellets of EAF dust is added together with coal and small amounts of slagging agents. Zoppi mentions that induction furnaces of the prior art are generally only used as a smelting means in secondary steel and non-ferrous metals processing.

Other patents that discuss the use of induction furnaces in smelting processes that involve steel processing dust include U.S. Pat. Nos. 5,980,606, 5,304,230, 5,249,198, 5,188,658, 4,878,944, 4,802,919, 4,762,554, 4,612,041, and 4,403,327.

The present invention is directed to a method operating an induction furnace to both produce a hot metal or pig iron product and to process iron and volatile metal containing materials such as EAF dust and BOF sludge/dust to recover iron value and concentrate metals which are volatile at the operating temperature of the induction furnace: above 1200° C., metals such as zinc, lead, cadmium, etc.

DISCLOSURE OF THE INVENTION

According to various features, characteristics and embodiments of the present invention which will become apparent as the description thereof proceeds, the present invention provides a method of processing iron and volatile metal containing materials such as electric arc furnace dust and BOF sludge/dust as a feedstock on a batch, continuous or semi-continuous basis which involves:

Providing feed materials from a source thereof, the feed material containing iron and volatile metal components (such as zinc);

Providing an induction furnace;

feeding an iron and volatile metal containing material into the induction furnace on a batch, continuous or semi-continuous basis; and obtaining an iron-containing product and recovering volatile metals (such as zinc) from the electric arc furnace dust and/or BOF sludge/dust.

The present invention further provides a method of recovering iron value from electric arc furnace dust and BOF sludge/dust on a batch, continuous or semi-continuous basis which involves:

Providing feed material containing iron and volatile metal components (such as zinc);

providing an induction furnace;

feeding an iron-containing material into the induction furnace on a batch, continuous or semi-continuous basis;

feeding the iron and volatile metal containing materials into the induction furnace together with the volatile metal components contained therein and with the iron-containing material so that iron oxide from the feed materials are reduced and recovered in an iron-containing product; and removing the iron-containing product and volatile metals from feed materials on a batch, continuous or semi-continuous basis.

The present invention also provides a method of operating an induction furnace which includes:

providing a facility having an induction furnace, which induction furnace receives an iron containing feed and produces an iron-containing product in the form of hot metal or pig iron;

receiving iron and volatile metal containing materials from at least one source, the source containing volatile metal components;

feeding said feed materials together with the volatile metal components contained therein into the induction furnace as a feedstock together with the iron containing feed on a batch, continuous or semi-continuous basis;

recovering iron from said electric arc furnace dust as a iron-containing hot metal or pig iron product produced from the induction furnace on a batch, continuous or semi-continuous basis; and recovering volatile metals from the feed material on a batch, continuous or semi-continuous basis.

BRIEF DESCRIPTION OF DRAWINGS

The present invention will be described with reference to the attached drawings which are given as non-limiting examples only, in which:

FIG. 3 and FIG. 4 depict the continuous operation of the present invention with the continuous addition of feed while volatile metals, iron and slag are continuously removed.

Figure 1:
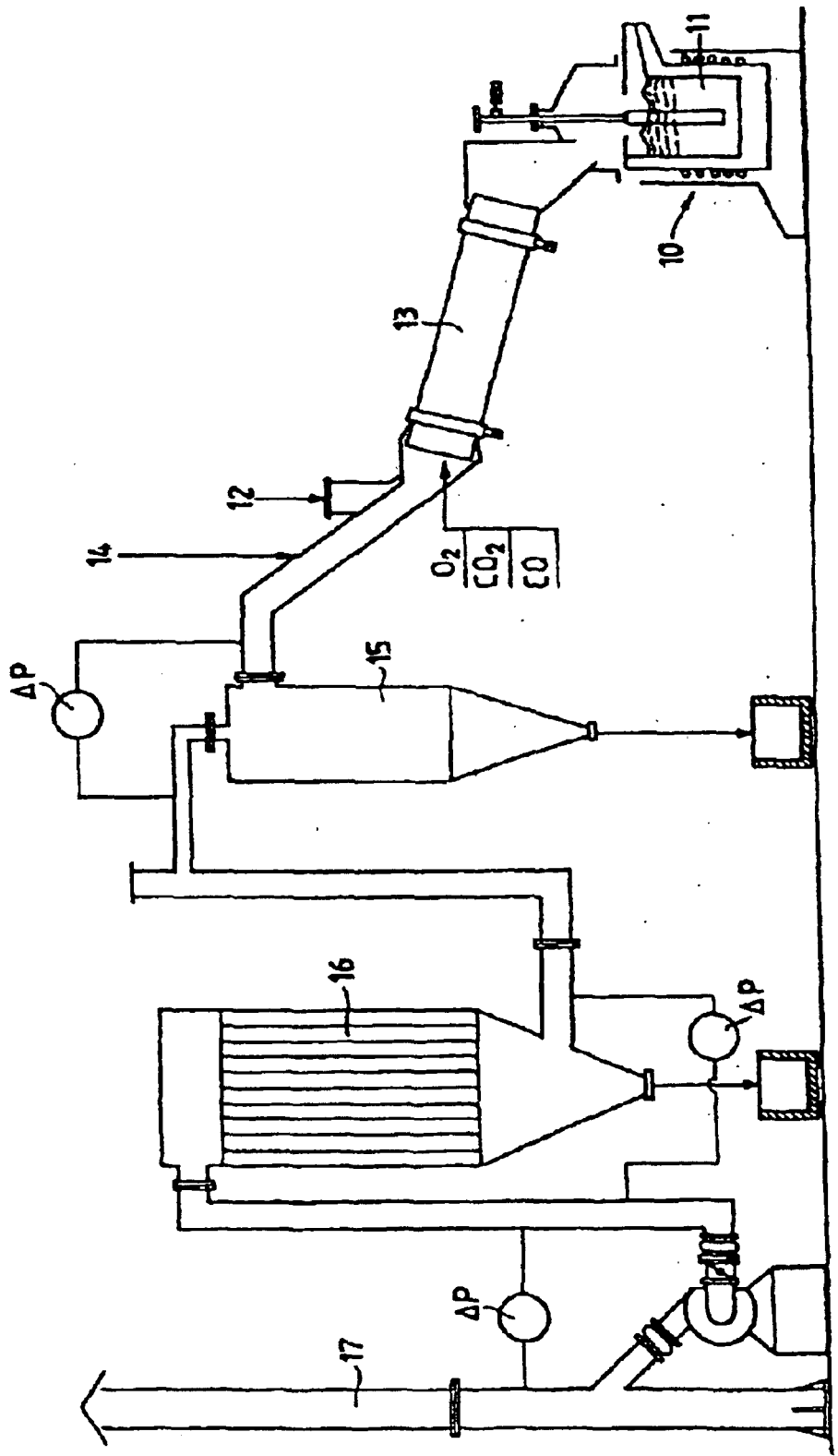
FIG. 1 depicts a prior art system that uses an induction furnace for the sole purpose of processing EAF dust to produce pig iron and volatile metal product.

The present invention involves methods and apparatus for processing iron and volatile metal containing materials including EAF dust and BOF sludge/dust from steel making operation as a feed stream to an induction furnace for iron recovery and concentration and/or recovery of volatile metals such as zinc, lead, cadmium, etc. The method increases the yield of iron from raw material feed. Further the method yields a volatile metal source of sufficient concentration to be an attractive feed for recovery of the volatile metal, or a source of the volatile metal for manufacturing. These features of the invention can be adapted and implemented with a minimal investment of capital by using existing infrastructures available at facilities that have and operate induction furnaces.

According to the present invention, an induction furnace used to process the iron and volatile metals containing feed material is designed to produce hot metal or pig iron product in addition to the processing of feed material. This dual purpose use improves the economical operation of an induction furnace facility and allows owners of the induction furnace facility to charge a fee (or reduce an existing cost) for receiving and processing the feed material as a feed stream from other facilities. At the same time, the owners of induction furnace facility can receive an economic value from the iron and zinc products that are recovered by the induction furnace. The technology of the present invention can be applied to existing induction furnace facilities/systems that are used in the iron and steel industries. Otherwise, the technology of the present invention can be incorporated into the design and installation of new induction furnace systems that would be installed for the dual purpose of processing iron and volatile metals containing material to produce hot metal or pig iron.

The ability to process iron and volatile metals containing materials in such a manner so as to provide both hot metal (or pig iron) for the steel and iron industry while being able to process waste materials such as EAF dust and BOF sludge/dust (which are traditionally processed or "treated" separately from steel or iron production processes) according to the present invention provides benefits over the operation of an induction furnace for either of these purposes in separate processes. While induction furnaces are routinely used for the processing of iron containing materials into iron and steel products or otherwise used solely for processing EAF dust, the present invention provides for the combination of these two processing operations in a single system. This dual processing will have the cumulative economic advantage of both operations in a single system, resulting in significant savings in capital and operating costs.

The process provided according to the present invention can be used in conjunction with existing induction furnaces, or as an enhancement in the operation of new systems installed specifically for purposes of the present invention. The process involves the addition of EAF dust, BOF sludge/dust or other iron containing materials either as raw dust or as material that is preprocessed into some convenient solid form such as briquettes or pellets, prior to its addition into the induction furnace along with other scrap iron feed. In addition, a source of carbon (coke, coal, or other carbon material) or other reductant can be added together with the feed material, as necessary, in order to insure that a reducing environment exists within the induction furnace system. In some cases sufficient carbon may be available in the molten iron bath, thus eliminating the need for additional carbon as a reducing material. In such a reducing environment, the metal oxides of the volatile metals in the feed material mixture are converted into their metal forms. Iron in the mixture will report to the molten iron bath in the furnace, while volatile metals such as zinc, lead and cadmium will be released from the metal bath as metal halides or metal fumes. According to the present invention, these metal halides and metal fumes are recovered by a dust collection system provided in communication with the induction furnace. The value of the dust material collected will be dependent on the concentration of valuable components, such as zinc which can be in the range of 30 to 70 wt. %, depending on operating and feed conditions.

Another variation on this invention includes the continuous or semi-continuous processing of iron and volatile metals containing materials in an induction furnace. This variation would have the feed material added to the induction furnace continuously (or semi-continuously). The volatile metal components of the feed materials are removed continuously from the process during normal operation of the invention. However, slag and iron components would normally build up in the furnace as the process is fed. In a semi-continuous operating mode, one of the liquids (slag or iron) remaining in the furnace would be removed continuously, while the other is removed when it fills the furnace completely. The continuous operation of this invention would include the continuous feeding of iron and volatile metals containing material and continuous removal of volatile metals, iron product and slag from the furnace.

The continuous process offers added advantages of allowing higher processing rates, better energy efficiency and extended operating life for equipment. Semi-continuous operation would provide the same basic benefits to a slightly lesser degree.

By processing EAF dust through an existing iron recovery process as a substitute or partial substitute for other feed materials or reactants, the EAF dust would no longer be considered a listed hazardous waste in the United States under RCRA waste rules. Such use of EAF dust would therefore eliminate a significant regulatory burden on the generator of the EAF dust and would moreover fulfill the goal of RCRA by enhancing the recovery of resources from materials that had been previously considered to be waste materials. The processing of BOF sludge/dust and other iron and volatile metals containing materials in this manner would improve the economics for the reuse of these materials, thus allowing them to be used instead of discarded to landfills.

At the present time EAF dust generators must pay a processing fee to process or dispose of their EAF dust. In this regard, the ability to have EAF dust processed, even for a fee, is limited by the zinc concentration of the EAF dust. The processing fee for lower zinc concentration dusts is sufficiently high to preclude recycle for zinc recovery. Accordingly, many EAF dust generators prefer to have their EAF dust stabilized to meet disposal standards prior to sending it to landfills. According to the present invention, the processing of the EAF dust as a feed stream results in increasing the zinc concentration. Thus, while it may not eliminate subsequent processing fees, the process method of the present invention makes it possible for EAF dust with lower zinc content to be processed to reclaim zinc value instead of disposed in landfills. BOF sludge/dust and other iron and volatile metals containing materials are subject to disposal costs when they are discarded to landfills. The processing of these materials in the manner described in this invention will reduce or eliminate this cost.

The present invention takes advantage of the principle that, if a material can be used as a substitute for other raw materials in an existing process, it is not a waste and therefore in the United States it cannot be a hazardous waste subject to RCRA regulations. A similar approach may apply or be adapted in other countries' regulations.

The present invention is based in part on the observation that since the most abundant element in EAF dust is iron, many steel making waste materials such as EAF dust and BOF sludge/dust would be a suitable material for processing in this same manner, i.e. as a feedstock for an induction furnace. The fact that processing iron and volatile metals containing materials in this manner would involve the use of existing equipment eliminates the need for costly capital equipment additions for this processing for facilities that have induction furnaces. Also, the fact that processes for iron oxide reuse are active, conventional processes make the addition of materials such as EAF dust and BOF sludge/dust to the overall process a minor change in the operation of a induction furnace facility.

As noted above, to date the recognition of EAF dust as a listed hazardous waste, has prevented the processing of EAF dust according to the present invention and has moreover prevented those in the industry from even considering such an idea, because of the common conclusion that using EAF dust as any type of feed or reactant will necessarily result in the formation, generation or preservation of a hazardous material. Therefore, while it is known to process or "treat" EAF dust as a waste material, conventional belief tends to prohibit consideration of the use of EAF dust as a feed or partial feed in an iron or steel making process.

According to the present invention, waste iron oxides, contained in the EAF dust, are actively recovered in induction furnace facilities as the EAF dust is used as a substitute for, or in addition to, and steel scrap that is fed into induction furnaces that are used to produce iron containing products, including steel.

This recovery may be advantageously accomplished by first making or incorporating the EAF dust into a form suitable for charging an induction furnace. For example, the EAF dust can be combined with other materials including reductants (coke, coal or other materials with reducing capabilities) and other iron oxide materials and formed into briquettes or pellets using conventional briquetting or pelletizing procedures and apparatus. It is also possible to add the EAF dust into an induction furnace without subjecting it to briquetting or pelletizing procedures; however, the pre-mixing of metal oxide materials and reductant materials greatly improves the processing capabilities of the system.

The present invention will be discussed with reference to FIGS. 1, 2 and 3 in which common reference numeral have been used to identified similar or common elements where possible to avoid having to repeat descriptions of such similar or common elements.

FIG. 1 depicts a prior art system that uses an induction furnace for the sole purpose of processing EAF dust. In FIG. 1 an induction furnace 10 which can be of the coreless (or channel) type is shown, inside of which, a charge of molten cast iron 11 is depicted as only partially filling the induction furnace 10. Charge 11 is consequently present as a molten bath under turbulent conditions inside the induction furnace 10 owing to the effect of the high intensity induced currents that are typical in induction furnaces.

The dusts from electrical steelworks, rich in zinc and iron oxides, are fed to induction furnace 10 through an inlet 12, and they are thus obliged to flow along an inclined drum 13, in countercurrent relative to the flow of hot air leaving induction furnace 10. The reaction heat generated inside the induction furnace 10 is thus used to dry and pre-heat the dusts while they are flowing towards induction furnace 10.

The oxides of non-ferrous metals leave the induction furnace 10 entrained by the stream of hot gas rich in CO. The reaction of CO with the hood air:

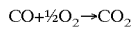

takes place during the passage of the fumes through inclined drum 13, along which the moist dust pellets which flow downwards, countercurrently relative to the fumes.

Upon leaving drum 13, the exhaust gases undergo a first cooling by the addition of air in a passage 14 and enter a cyclone 15 in which the coarsest and heaviest components are removed. The complete dust removal takes place inside a sock or bag filter 16 that can be of a "pulse-jet" type, installed upstream from a chimney 17.

The volatile metal oxides contained within the pre-heated, dried dust entering the induction furnace 10 are subject to reduction within the bath contained in the induction furnace 10 so that their volatile metal vapors are released. As the volatile metal vapors leave the bath they are oxidized and the volatile metal oxides are collected in the sock or bag filter for collection and recovery of zinc, lead, cadmium, etc.

Figure 2:
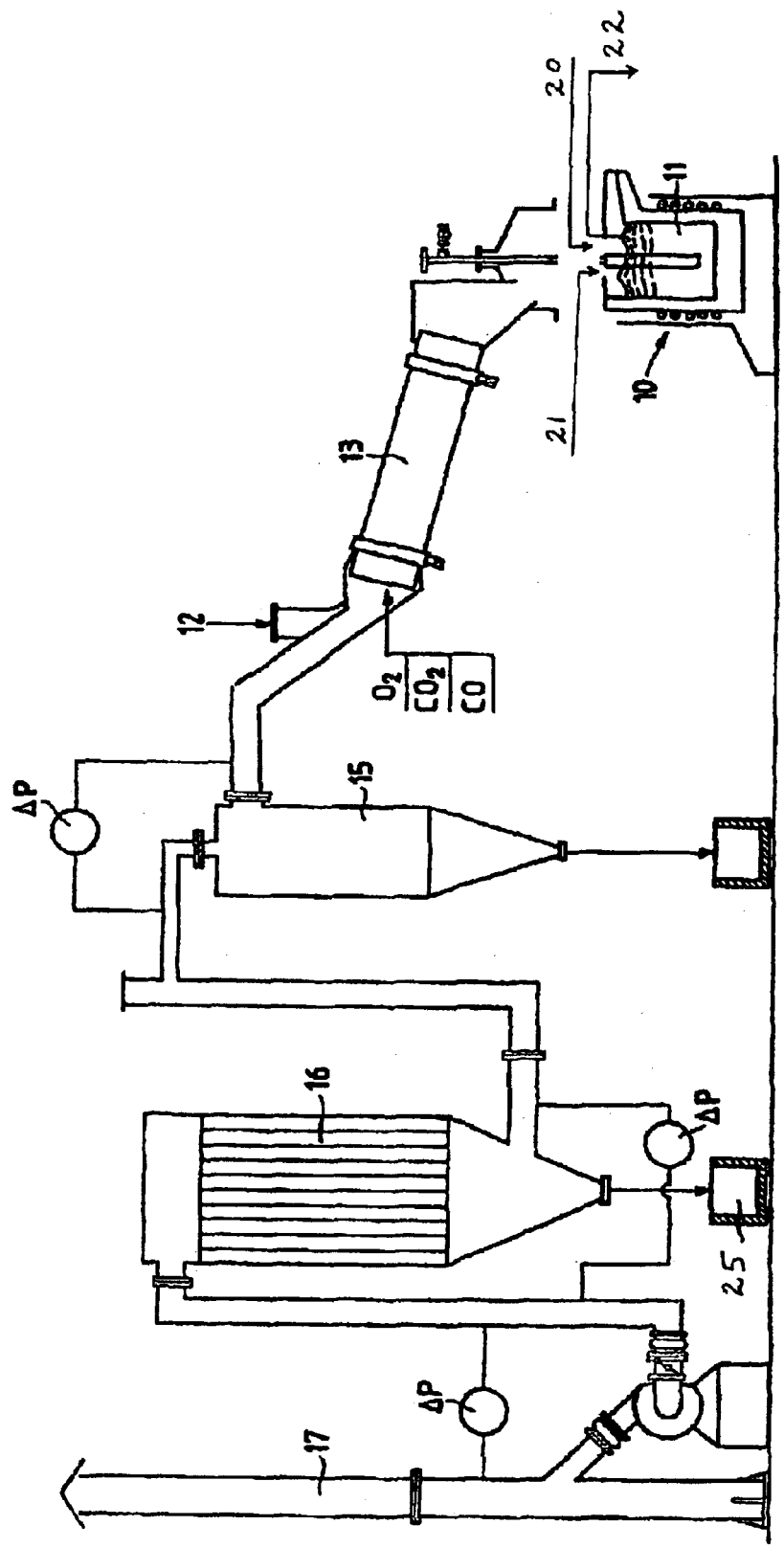
FIG. 2 depicts the a system according to one embodiment of the present invention that uses an induction furnace to both produce hot metal (or pig iron) and to recover iron value from materials containing both iron and volatile metal, including EAF dust while concentrating volatile metals such as zinc, lead, cadmium, etc. This process can be operated in a batch, continuous or semi-continuous basis by removing iron product, volatile metals and slag while material is being fed.

FIG. 2 depicts a system according to one embodiment of the present invention that uses an induction furnace 10 to both produce hot metal or pig iron and to recover iron value from EAF dust or other iron and volatile metals containing materials while concentrating volatile metals such as zinc, lead, cadmium, etc. The system depicted in FIG. 2 is similar to that depicted in FIG. 1 except for the materials that are charged into and removed from the induction furnace 10. In addition to the elements depicted in FIG. 1, FIG. 2 further includes a charge or feed stream 20 for feeding or charging scrap steel, hot metal, sinter dust, basic oxygen furnace ("BOF") sludge and other iron oxide-containing materials into the induction furnace 10, and another charge or feed stream 21 for feeding or charging the iron and volatile metals containing materials into the induction furnace 10. It is to be understood that the materials depicted as being fed or charged into the induction furnace 10 in charge of feed streams 20 and 21 could be combined and fed or charged into the induction furnace 10. Also, it is to be understood that the feed stream 21 for feeding or charging feed materials into the induction furnace 10 can be used together with or in place of inlet 12, or eliminated if sufficient feed materials can be fed or charged through inlet 12.

FIG. 2 also depicts a product stream 22 which represents hot metal product or pig iron such as an iron product that is discharged from the induction furnace 10, and identifies by reference numeral 25 the collection point where oxides of zinc, lead, cadmium and other volatile metals are recovered in the manner taught by U.S. Pat. No. 6,136,059 to Zoppi, from which patent prior art FIG. 1 is taken. These collected volatile metal oxides can be subsequently processed to recover the volatile metals according to conventional processes.

FIG. 3 depicts a system according to an embodiment of the present invention that uses an induction furnace 10 operated in a continuous fashion to process feed materials while producing hot metal or pig iron, concentrating volatile metals such as zinc, lead, cadmium, etc. and slag. The system depicted in FIG. 3 is similar to the other figures, except that the materials may be charged into and removed from the induction furnace on a continuous manner. FIG. 3 includes a feed stream 20 for feeding scrap steel, hot metal, sinter dust, basic oxygen furnace (BOF) sludge and other iron oxide-containing materials into the induction furnace 10, and another charge or feed stream 21 for feeding or charging the iron and volatile metals containing materials into the induction furnace 10. It is to be understood that the material depicted as being fed or charged into the induction furnace 10 in the charge of feed streams 20 and 21 could be combined and fed or charged into the induction furnace 10.

FIG. 3 also depicts a product stream 22 which represents hot metal or pig iron product discharged from the induction furnace 10 in a continuous manner. Zinc, lead, cadmium and other volatile metal as metals, halides or oxides are recovered from the gas stream 25 in the manner taught by U.S. Pat. No. 6,136,059 to Zoppi, from which patent prior art FIG. 1 is taken. These collected volatile metal materials can be subsequently processed to recover the volatile metals according to conventional processes.

During the operation of the system according to the continuous operation of the present invention, the slag layer will also be removed in a continuous manner. The level of the slag layer and discharge point of the slag will be controlled by using a dam 27 that extends into the slag layer. A second dam 28 will extend through the slag layer into the hot metal at the point where the hot metal stream 22 is discharged from the induction furnace 10.

During the operation of the system according to the present invention, the slag layer can be controlled using conventional methods. For example, the thickness and composition of the slag layer can be controlled by the addition of suitable chemical slagging agents or by mechanically removing, e.g. skimming, the slag layer if desired. It is also possible to more fully charge the induction furnace 10 according to the present invention.

Although the present invention has been described with reference to particular means, materials and embodiments, from the foregoing description, one skilled in the art can easily ascertain the essential characteristics of the present invention and various changes and modifications can be made to adapt the various uses and characteristics without departing from the spirit and scope of the present invention as described above. For example, if the feed material is in the form of dried pellets or briquettes, the inclined drum may not be needed for drying and preheating the feed material. Other examples involving the continuous or semi-continuous feed and removal of liquid products from the process have been described in earlier discussions.

What is claimed is:

1. A method of processing a volatile metal containing basic oxygen furnace sludge/dust and optionally other materials as a feedstock containing iron and volatile metal which comprises:

feeding an iron-containing material into an induction furnace containing molten iron on a batch, continuous or semi-continuous basis;

feeding the volatile metal containing material to the induction furnace on a batch, continuous, or semi-continuous basis; and obtaining an iron-containing product on a continuous or semi-continuous basis and recovering volatile metals.

2. The method according to claim 1 wherein the iron-containing material comprises at least one of scrap steel, hot metal and sinter dust.

3. The method according to claim 1, wherein the volatile metals comprise at least one of zinc, lead and cadmium.

4. The method according to claim 1, wherein the volatile metals are recovered by releasing the volatile metals as vapors from the induction furnace and recovering the volatile metal vapors.

5. A method according to claim 1, wherein a reductant is fed into the induction furnace together with the feedstock of iron-containing material.

6. A method according to claim 5, wherein the feedstock is combined with a reductant into a solid form before being fed into the induction furnace.

7. A method of processing iron and volatile metal containing material which comprises:

providing an induction furnace;

feeding an iron-containing material into the induction furnace on a continuous or semi-continuous basis;

feeding the volatile metal containing feed material together with the volatile metal components therein into the induction furnace with the iron-containing material; and obtaining an iron-containing product on a continuous or semi-continuous basis and recovering volatile metals.

8. A method according to claim 7, wherein the iron-containing material comprises at least one of scrap steel, hot metal and sinter dust.

9. A method according to claim 7, wherein the volatile metals comprise at least one of zinc, lead and cadmium.

10. A method according to claim 7, wherein the volatile metals are recovered by releasing the volatile metals as vapors from the induction furnace and recovering the volatile metal vapors.

11. A method according to claim 7, wherein a reductant source is fed into the induction furnace together with the feed materials and iron-containing material.

12. A method according to claim 11, wherein the feed materials are processed by combining them with a reductant into a solid form before being fed into the induction furnace.

13. A method of operating an induction furnace which comprises:

feeding an iron containing feed material to the induction furnace on a batch, continuous or semi-continuous basis;

feeding a volatile metal containing material into the induction furnace as a feedstock on a batch, continuous or semi-continuous basis;

recovering iron from the induction furnace on a continuous or semi-continuous basis; and recovering volatile metals.

14. A method of operating an induction furnace according to claim 13, wherein the iron and volatile metals containing material is produced at a facility that is different from the facility having the induction furnace.

15. A method of operating an induction furnace according to claim 13, wherein the iron containing feed comprises at least one of scrap steel, hot metal and sinter dust.

16. A method of operating an induction furnace according to claim 13, wherein the volatile metals comprise at least one of zinc, lead and cadmium.

17. A method of operating an induction furnace according to claim 13, wherein the volatile metals are recovered by releasing the volatile metals as vapors from the induction furnace and recovering the volatile metal vapors.

18. A method of operating an induction furnace according to claim 13, wherein a reductant is fed into the induction furnace together with the iron and volatile metal containing material.

19. A method of operating an induction furnace according to claim 18, wherein the feed materials are processed by combining them with a reductant into a solid form before being fed into the induction furnace.

* * * * *